US 8,082,300 B2

(12) United States Patent
Barnier et al.

(10) Patent No.: US 8,082,300 B2
(45) Date of Patent: Dec. 20, 2011

(54) WEB BASED EXTRANET ARCHITECTURE PROVIDING APPLICATIONS TO NON-RELATED SUBSCRIBERS

(75) Inventors: Brian Glen Barnier, Naperville, IL (US); Randy S. Mueller, LaGrange, IL (US); Thomas Terence Dean, Farmington Hills, MI (US); Richard T. Madrid, Tampa, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1572 days.

(21) Appl. No.: 10/744,961

(22) Filed: Dec. 23, 2003

(65) Prior Publication Data

US 2004/0199583 A1 Oct. 7, 2004

Related U.S. Application Data

(63) Continuation of application No. 10/246,430, filed on Sep. 17, 2002, now Pat. No. 6,697,861, which is a continuation of application No. 09/187,556, filed on Nov. 6, 1998, now Pat. No. 6,453,348.

(51) Int. Cl.
G06F 15/16 (2006.01)
(52) U.S. Cl. ........................................ 709/204; 709/205
(58) Field of Classification Search ........... 709/204–205
See application file for complete search history.

(56) References Cited

U.S. PATENT DOCUMENTS

| 5,051,822 A | * | 9/1991 | Rhoades ........................ 463/25 |
| 5,329,619 A | | 7/1994 | Page et al. |
| 5,586,312 A | | 12/1996 | Johnson et al. |
| 5,675,802 A | * | 10/1997 | Allen et al. .................... 717/103 |
| 5,721,913 A | | 2/1998 | Ackroff et al. |
| 5,754,782 A | * | 5/1998 | Masada .......................... 709/213 |
| 5,757,925 A | | 5/1998 | Faybishenko |
| 5,771,354 A | * | 6/1998 | Crawford ...................... 709/229 |
| 5,779,549 A | * | 7/1998 | Walker et al. ................... 463/42 |
| 5,790,127 A | * | 8/1998 | Anderson et al. ............. 715/802 |
| 5,813,007 A | * | 9/1998 | Nielsen .......................... 707/10 |
| 5,832,511 A | | 11/1998 | Beck et al. |
| 5,835,911 A | * | 11/1998 | Nakagawa et al. ........... 707/203 |
| 5,845,090 A | * | 12/1998 | Collins et al. ................. 709/221 |
| 5,852,809 A | * | 12/1998 | Abel et al. ...................... 705/26 |
| 5,862,325 A | * | 1/1999 | Reed et al. .................... 709/201 |
| 5,862,346 A | * | 1/1999 | Kley et al. ..................... 709/245 |
| 5,925,127 A | * | 7/1999 | Ahmad ........................... 726/31 |
| 5,946,464 A | * | 8/1999 | Kito et al. ..................... 709/202 |
| 5,963,207 A | | 10/1999 | Brewer et al. |

(Continued)

OTHER PUBLICATIONS

Fitzloff and Kujubu, "Ameritech Expands EBX Extranet Offerings," InfoWorld, vol. 19, Issue 42, Oct. 20, 1997, 2 pages.

(Continued)

*Primary Examiner* — Firmin Backer
*Assistant Examiner* — Brian P Whipple
(74) *Attorney, Agent, or Firm* — Andrew Gust; Guntin Meles & Gust, PLC

(57) ABSTRACT

An extranet includes a network which couples a plurality of non-related participants and a server coupled to the network. The server stores a plurality of applications including workgroup applicants, transaction applications, security applications and transport circuits and equipment. The server is programmed to load particular ones of the plurality of applications onto the network for use by the plurality of participants in response to a request by one of the participants for a particular application.

12 Claims, 5 Drawing Sheets

WELCOME <SUBSCRIBER'S NAME>
SELECT THE APPLICATION YOU NEED FOR INSTANT PRODUCTIVITY:

20 — E-MAIL: TALK TO YOUR PARTNERS THROUGH YOUR MAIL BROWSER

22 — FILE TRANSFER SERVER: SHARE FILES WITH PARTNERS NEAR AND FAR.

24 — LIST SERVER: GET YOUR MESSAGE OUT FAST AND EASY

26 — PARTNER DIRECTORY: WHO'S WHO IN YOUR VIRTUAL COMMUNITY

28 — JAVA-BASED OFFICE SOFTWARE: RUN ANYWHERE WORD PROCESSOR, SPREADSHEET, PRESENTATIONS, DATABASE, CONTACT MANAGER, AND FLOW CHARTS

30 — COLLABORATION SUITE: CUT CYCLE TIME WITH PROJECT MANAGEMENT, DISCUSSION GROUPS, WORK FLOW TRACKING, DOCUMENT AND IMAGE LIBRARY, AND BULLETIN BOARDS

32 — ELECTRONIC DATA INTERCHANGE: SELL IT SIMPLY THROUGH INTERACTIVE FORMS

34 — JAVA APPLET VAULT: GET APPLET POWER + FLEXIBILITY WITH SECURITY.

36 — INTERACTIVE COMMERCE ENGINE: SEAMLESS INTERFACE TO LEGACY SYSTEM DATABASES

U.S. PATENT DOCUMENTS

| | | | |
|---|---|---|---|
| 5,970,475 A | | 10/1999 | Barnes et al. |
| 6,014,651 A | * | 1/2000 | Crawford ..................... 705/400 |
| 6,015,344 A | * | 1/2000 | Kelly et al. ..................... 463/16 |
| 6,032,118 A | | 2/2000 | Tello et al. |
| 6,035,423 A | * | 3/2000 | Hodges et al. .................. 714/38 |
| 6,061,796 A | | 5/2000 | Chen et al. |
| 6,076,105 A | * | 6/2000 | Wolff et al. ................... 709/223 |
| 6,088,796 A | | 7/2000 | Cianfrocca et al. |
| 6,098,054 A | | 8/2000 | McCollom et al. |
| 6,115,040 A | * | 9/2000 | Bladow et al. ................ 715/741 |
| 6,119,149 A | | 9/2000 | Notani |
| 6,167,433 A | * | 12/2000 | Maples et al. ................ 709/204 |
| 6,185,551 B1 | * | 2/2001 | Birrell et al. ...................... 707/3 |
| 6,199,204 B1 | | 3/2001 | Donahue |
| 6,205,147 B1 | | 3/2001 | Mayo et al. |
| 6,212,549 B1 | * | 4/2001 | Page et al. ..................... 709/205 |
| 6,223,177 B1 | * | 4/2001 | Tatham et al. ......................... 1/1 |
| 6,226,748 B1 | | 5/2001 | Bots et al. |
| 6,226,751 B1 | | 5/2001 | Arrow et al. |
| 6,237,020 B1 | * | 5/2001 | Leymann et al. ............. 709/201 |
| 6,282,709 B1 | * | 8/2001 | Reha et al. .................... 717/175 |
| 6,289,511 B1 | * | 9/2001 | Hubinette ...................... 717/173 |
| 6,353,926 B1 | * | 3/2002 | Parthesarathy et al. ....... 717/170 |
| 6,378,069 B1 | * | 4/2002 | Sandler et al. ................ 713/153 |
| 6,453,348 B1 | | 9/2002 | Barnier et al. |
| 6,526,456 B1 | * | 2/2003 | Allan et al. .................... 719/328 |
| 6,692,359 B1 | * | 2/2004 | Williams et al. ................ 463/42 |
| 6,697,861 B2 | | 2/2004 | Barnier et al. |

OTHER PUBLICATIONS

Andreesen, et al., The Networked Enterprise: Netscape Enterprise Vision and Product Roadmap, located at http://home.netscape.com/comprod/at_work/white_paper/vision/intro.html, 5 pages, retrieved Aug. 27, 1997.

White Paper—Lotus's Internet Applications: Bringing Extensible Business Solutions to the 'Net, located at http://www.lotus.com/corpcomm/3582.htm, 6 pages, retrieved Aug. 27, 1997.

White Paper—Notes and Transaction System: mQSeries and CICS Link for Lotus Notes, Integrating Transaction and Client/Server Systems, located at http://www.lotus.com/corpcomm/2596.htm, 6 pages, retrieved Aug. 27, 1997.

Reisman, Extranets and Intergroupware: A convergence for the next generation in electronic media-based activity, located at http://www.teleshuttle.com/media/IngerGW.htm, 4 pages, retrieved Aug. 26, 1997.

What Is . . . extranet (a definition), located at http://whatis.com/extranet.htm, 1 page, retrieved Aug. 26, 1997.

Highleyman, OLTP Middleware Integrates Client and Server Applications, located at http://www.xstar.comcarnt/info/oltp.html, 4 pages, retrieved Aug. 27, 1997.

Reisman, What's an extranet? and other key terms, located at http://www.teleshuttle.com/media/extradef, 1 pages, retrieved Aug. 27, 1997.

Bhardwaj, Re; VPN, Extranet, Internet, located at http://www.innergy.com/ix/arc/886.html, 1 page, retrieved Dec. 4, 1997.

What Is . . . intranet (a definition), located at http://whatis.com/intranet.htm, 1 page, retrieved Dec. 4, 1997.

getAccess Fact Sheet, Integrated Environment for User Access and Resource Deployment on the Extranet, located at http://www.encommerce.com/public/products/docs/getaccess/getaccess.html, 3 pages, retrieved Aug. 26, 1997.

getAccess Fact Sheet, How Get Access Works, located at http://www.encommerce.com/public/products/docs/getaccess/getaccess2.html, 3 pages, retrieved Aug. 26, 1997.

getAccess Data Sheet, located at http://www.encommerce.com/public/products/docs/gads/resource.html, 1 page, retrieved Aug. 26, 1997.

OneSoft Corporation, The Extranet Solution, The Business Software Application for the 21st Century, Sample Extranet Scenarios, located at http://www.gxinet.com/scripts/IAS.DLL?SubSystemID=1&ComponentID=263, 5 pages, retrieved Aug. 26, 1997.

OneSoft Corporation, The Extranet Solution, The Business Software Application for the 21st Century, Extranet Components, located at http://www.gxinet.com/scripts/IAS.DLL?SubSystemID=1&ComponentID=265, 4 pages, retrieved Aug. 26, 1997.

AT&T Intranet/Extranet Service, located at http://www.att.net.hk/products/intranet_extranet.html, 2 pages, retrieved on Dec. 4, 1997.

NetMinute #405, Intranet, Internet, Extranet, located at http://www.netminute.com/NM100405.htm, retrieved on Dec. 4, 1997.

Adlai-Gail, Opinion and Outlook: Extra! Extra! Now's the Time to Build an Extranet, It's a Win-Win Tool in Line for Explosive Growth, located at http://www.otcg.com/html/body_build_an_extranet.html, 2 pages, retrieved on Dec. 4, 1997.

Overview of Extranet Standards, Extending the Networked Enterprise, located at http://home.netscape.com/comprod/at_work/white_paper/extranetstds.html, 5 pages, retrieved on Aug. 26, 1997.

The Rise of the Extranet, Linking Business Partners Via Internet Technology, located at http://pctoday.com/editorial/goinonline/970235a.html, 2 pages, retrieved on Dec. 4, 1997.

Jilovec, The Role of EDI in Extranets, located at http://www.midrangesystems.com/Archive/1997/oct10/jilo1016.htm, 2 pages, retrieved on Dec. 4, 1997.

Tebbe, Extranets intelligently link intranets, located at http://www8.zzzdnet.com/pcweek/opinion/1111/11neteff.html, 1 page, Nov. 11, 1996.

OneSoft Corporation, The Extranet Solution, The Business Software Application for the 21st Century, The Extranet, located at http://www.gxinet.com/scripts/IAS.DLL?SubSystemID=1&ComponentID=261, 1 page, retrieved Aug. 26, 1997.

OneSoft Corporation, The Extranet Solution, The Business Software Application for the 21st Century, Introduction: The Third Wave of Internet Evolution, located at http://www.gxinet.com/scripts/IAS.DLL?SubSystemID=1&ComponentID=260, 2 pages, retrieved Aug. 26, 1997.

Reisman, Extranets and Intergroupware, A convergence for the next generation in electronic media-based activity, located at http://www.teleshuttle.com/media/InterGW.html, 4 pages, retrieved on Aug. 26, 1997.

Open Text Offers Livelink as a Subscription Service, located at http://newswire.ca/releases/January1998/12/c2081.html, 1 page, retrieved on Apr. 6, 1998.

Harbinger Overview, located at http://www.harbinger.com/info/overview.htm, 7 pages, retrieved on Apr. 6, 1998.

Oracle Applications, located at http://www.oracle.com/products/applications, 2 pages, retrieved on Apr. 6, 1998.

Vitro Crop. Chooses Open Text's Livelink Intranet to Improve Systems Engineering Document Management, located at http://www.newswire.ca/releases/March1997/26/c5800.html, 2 pages, retrieved on Apr. 6, 1998.

Intranet to Extranet, located at http://www.tw2.com/extra.html, 1 page, retrieved on Dec. 4, 1997.

Ameritech Offers Online Bond Info. (PublicFinance.com Enables Local Governments Tor Provide Bond Information Online (Company Business and Marketing), located at https://www.thedacs.com/techs/abstract/75495, 6 pages, retrieved Nov. 4, 2008.

* cited by examiner

WELCOME <SUBSCRIBER'S NAME>
SELECT THE APPLICATION YOU NEED FOR INSTANT PRODUCTIVITY:

20  E-MAIL:TALK TO YOUR PARTNERS THROUGH YOUR MAIL BROWSER

22  FILE TRANSFER SERVER:SHARE FILES WITH PARTNERS NEAR AND FAR.

24  LIST SERVER:GET YOUR MESSAGE OUT FAST AND EASY

26  PARTNER DIRECTORY: WHO'S WHO IN YOUR VIRTUAL COMMUNITY

28  JAVA-BASED OFFICE SOFTWARE: RUN ANYWHERE WORD PROCESSOR, SPREADSHEET, PRESENTATIONS, DATABASE, CONTACT MANAGER, AND FLOW CHARTS 30  COLLABORATION SUITE: CUT CYCLE TIME WITH PROJECT MANAGEMENT, DISCUSSION GROUPS, WORK FLOW TRACKING, DOCUMENT AND IMAGE LIBRARY, AND BULLETIN BOARDS 32  ELECTRONIC DATA INTERCHANGE: SELL IT SIMPLY THROUGH INTERACTIVE FORMS 34  JAVA APPLET VAULT: GET APPLET POWER + FLEXIBILITY WITH SECURITY.

36  INTERACTIVE COMMERCE ENGINE: SEAMLESS INTERFACE TO LEGACY SYSTEM DATABASES

FIG. 2

WEB BASED EXTRANET ARCHITECTURE PROVIDING APPLICATIONS TO NON-RELATED SUBSCRIBERS

RELATED APPLICATIONS

This is application is a continuation of U.S. application Ser. No. 10/246,430, filed Sep. 17, 2002, now U.S. Pat. No. 6,697,861, which is a continuation of U.S. application Ser. No. 09/187,556, filed Nov. 6, 1998, issued as U.S. Pat. No. 6,453,348 on Sep. 17, 2002.

FIELD OF THE INVENTION

The present invention is directed to an extranet architecture, and more particularly, to an extranet architecture utilizing Web based technology that provides a large variety of applications to non-related subscribers.

BACKGROUND

Various forms of intranets have provided companies with intraoffice communications for some time. An intranet may be defined as a private application of the same internetworking technology, software and applications within a private network for use within an organization. It may be entirely disconnected from the public Internet or it may be linked to it and protected from unauthorized access by security systems. Such known networks are commonly called "intraoffice" networks because they only allow communications within an organization.

Other networks, often referred to as "extranets" or private internets allow communications and application sharing between designated, non-related organizations. Extranets are generally closed networks that allow communications between designated parties. Various types of "extranet" architectures are known. One type of extranet architecture is often referred to as a shared private network where the organizations that have access to the network are enumerated and often a third party is in charge of updating the list of enumerated users and managing passwords. One such type of shared private network between two organizations, for example, a shipping dock and receiving dock, may be linked to exchange information regarding orders. This is generally the oldest type of extranet. Such extranets have also been used for electronic data interchange (EDI) and involve coupling two organizations through a third party provider using typically X0.25 protocols and not necessarily using Internet Protocols ("IP"). This type of extranet architecture has certain disadvantages. For one, the connection is for a specific purpose and thus has very limited application. Second, only a limited number of an organization's business partners have reason to connect in this manner. Third, typically lower data communications and lack of IP capabilities limit the general usefulness of such configurations.

Another type of extranet architecture couples a plurality of non-related organizations together with appropriate routing and traffic management capabilities. The organizations may communicate with one another and share various applications. Some implementations are managed by one business partner. This obviously has the drawback that such a system is expensive to implement and particularly burdensome for one party to maintain. While cost-sharing arrangements may be created, one part must still consume the same organizational resources needed to maintain a network for others. While these types of extranets provide good security, they lack the bandwidth to accommodate a large number of applications.

Other types of extranets utilize the Internet which provides increased bandwidth but lacks the security of shared private networks. One such type of network which couples organizations through the Internet is referred to as a virtual private network. The variety of virtual private network extranet utilizes facilities of one or more Internet service providers combined with the user's own VPN software instead of setting up a dedicated private network. In order to maintain a level of security, communications over the Internet must be encrypted. A main difference between a virtual private network extranet and the Internet, in general, is that for a virtual private network extranet access is encrypted and limited to designated organizations and/or individuals rather than the world at large. Of course in selecting a particular extranet architecture, the benefits in cost savings must be weighed against security risks.

It is thus desirable to provide an extranet architecture coupled to a wide diversity of applications that may be shared by non-related organizations while eliminating the need for any one organization to maintain the available applications. It is also desirable to provide an extranet architecture that provides an appropriate degree of security and privacy. It is furthermore desirable to provide an extranet architecture that is flexible and can be easily modified and updated.

BRIEF SUMMARY

According to a first aspect of the invention there is provided a method for providing an extranet service between at least two subscribers. The method includes the steps of:

interconnecting the plurality of subscribers by digital data circuits to form an extranet;

coupling a server to the extranet wherein the server stores a plurality of applications and data including collaboration software, office productivity software, and electronic data interchange software:

loading at least one of the plurality of applications onto the extranet for use by the plurality of subscribers in response to a request by a subscriber for a particular application.

According to a second aspect of the invention there is provided a method for providing an extranet service between subscribers. The method includes the steps of:

(a) establishing a subscriber database listing customers who subscribe to the extranet service;

(b) establishing a communication link between the subscribers listed in the subscriber database to form an extranet;

(c) providing collaboration software applications on the extranet;

(d) providing workflow software applications on the extranet;

(e) providing transaction software applications on the extranet;

(f) providing electronic mail software applications on the extranet;

(g) providing electronic data interchange software applications on the extranet;

(h) sharing the software application provided in steps (b)-(g) among the subscribers listed in the subscriber database.

According to a third aspect of the invention there is provided a method for providing an extranet service between customers, the method comprising the steps of:

(a) establishing a communication link between customers to form an extranet;

(b) providing workgroup software on the extranet;

(c) providing transaction software on the extranet;

(d) providing security software on the extranet;

(e) providing transport software (f) sharing the software provided in steps (b)-(e) to the customers on the extranet.

According to a fourth aspect of the invention there is provided an extranet including a network coupling a plurality of non-related participants wherein each participant is located remotely from the other participants, and a server coupled to the network, the server storing a plurality of applications including workgroup applications, transaction applications, security applications and transport applications wherein the server is programmed to load particular ones of the plurality of applications onto the network for use by the plurality of participants in response to a request by one of the plurality of participants.

BRIEF DESCRIPTION OF THE DRAWINGS

FIG. 2 is an example of a screen menu that can be displayed on a subscriber's display.

DETAILED DESCRIPTION OF THE DRAWINGS AND THE PRESENTLY PREFERRED EMBODIMENTS

Figure 1:
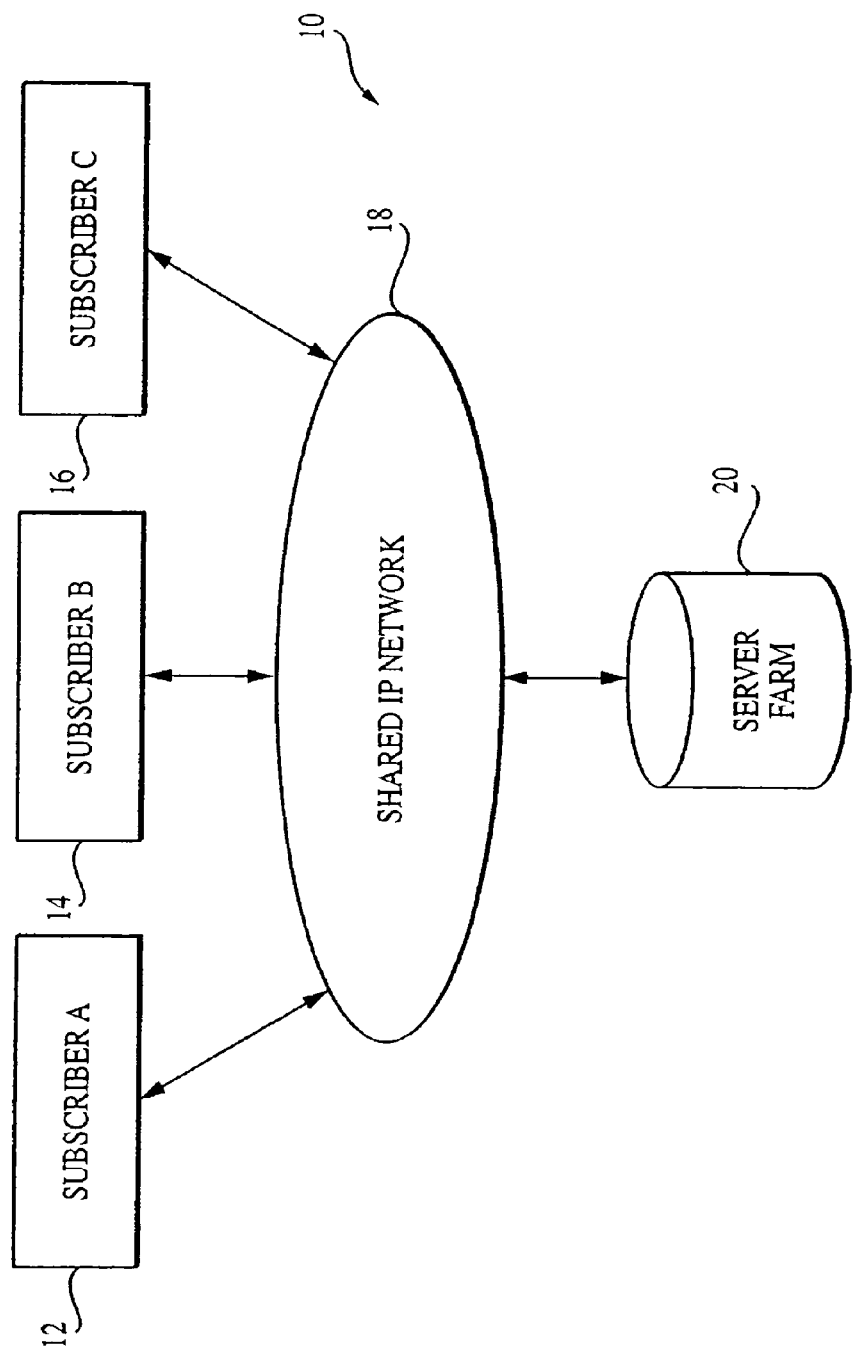
FIG. 1 is a schematic illustration of an extranet architecture according to a preferred embodiment of the present invention.

FIG. 1 is a schematic illustration of an extranet architecture according to a preferred embodiment of the present invention. The architecture 10 includes generally a plurality of subscribers 12, 14, 16; a shared network 18 utilizing Internet Protocol ("IP"), and a server farm 20. As shown, the shared network 18 couples the plurality of subscribers to the server farm 20. While the various components will be described in detail hereinafter, in general the server farm 20 is an interconnected grouping of storage devices that stores a multitude of applications and databases, for example, on redundant disks as will be described hereinafter.

In general, the subscribers are non-related entities, for example, different companies and/or organizations, or individuals. A subscriber on the shared network 18 may have access to some or all of the applications and data available on the server farm 20 through their network connection. Access for an individual user would be determined by what applications the user or user's organization has subscribed to; the access granted to data and applications granted by the user's organization; and the access granted to particular data files by owners of those files. This could mean access to a server-based application through a client's browser or distributing, updating and connecting a client/server application. In a preferred embodiment, Web browser technology is used to present each subscriber with a menu of applications from which they may choose merely by clicking on a particular icon displayed on a display unit (not shown).

Shown in FIG. 2 is an example of a screen menu that can be displayed on a display of a subscriber's computer, for example. Illustrated are various menu icons that represent applications available to the subscriber from which the subscriber can select merely by clicking on a menu icon. The selection of applications is intended to be illustrative and not limiting. It will be appreciated that future upgrades may replace or eliminate applications illustrated while adding new ones. For example, icon 20 represents an electronic mail application which allows subscribers to communicate with one another over the extranet. Icon 22 represents a file transfer server application that allows subscribers to share files over the extranet. Icon 24 represents a list server application that allows subscribers to create address groups so that electronic messages can be created simply and efficiently. Icon 26 represents a partner directory that lists subscribers on the extranet. Icon 28 represents Java-based office applications which provide word processor, spreadsheet, presentations, database applications. Icon 32 represents a collaboration suite application which includes project management, discussion groups, work flow engine, document and image library and bulletin board applications. Icon 34 represents an electronic data interchange (EDI) application. This would enable low-volume EDI users to enter transactions into a Web page or enable medium-volume users to send transactions by secure EDI—MIME type e-mail. Icon 36 represents a Java applet vault application to provide, store and verify digital certificates for Java applets shared by subscribers. Of course more applications may be added to the server farm. While FIG. 2 illustrates particular applications, a subscriber's access to certain applications may be limited and not all of the subscribers may have access to all of the applications based on the user's security profile.

Figure 3:
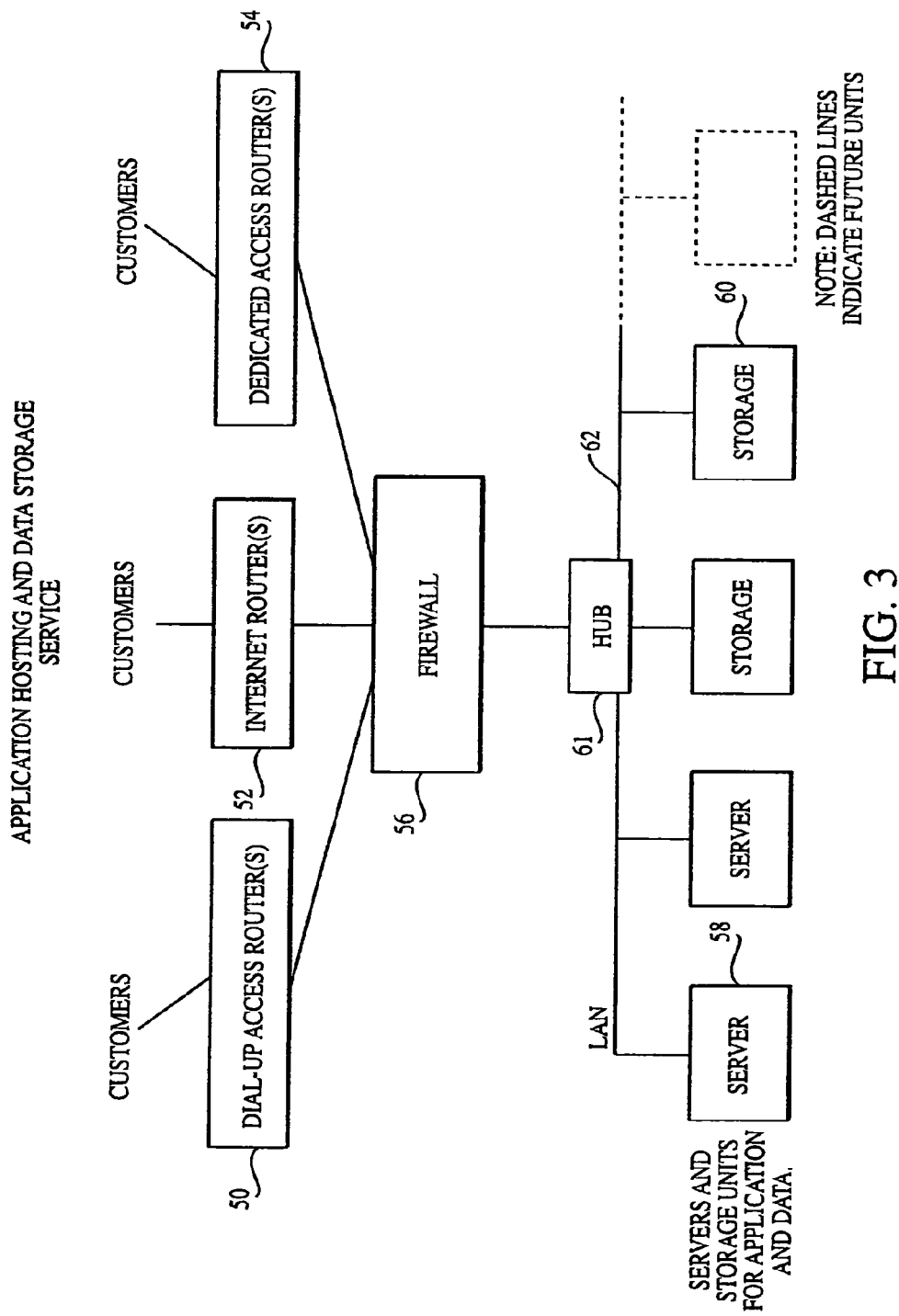
FIG. 3 is a more detailed schematic block diagram of the extranet architecture shown in FIG. 1 according to a preferred embodiment of the present invention.

FIG. 3 is a more detailed schematic block diagram of the extranet architecture shown in FIG. 1 according to a preferred embodiment of the present invention. Three subscribers 12, 14 and 16 are illustrated, but, of course there may be more or less. In addition, the term "subscriber" is used to refer to non-related entities, i.e., two companies, for example. Each subscriber may have its own intranet coupling various of its organizations, for example, in the form of a local area network although the present invention is not limited to subscribers having local area networks and individuals having a workstation may also be subscribers. While only three subscribers are shown it will be appreciated that many more subscribers can be coupled together with the extranet architecture according to the present invention. The shared network 18 includes various routers, and more particularly, dial-up access routers 50, Internet access routers 52 and dedicated access routers 54 that provide the subscribers with various options for accessing the shared network 18 as will be described in greater detail hereinafter.

Security may be provided in various ways such as by what is commonly referred to as a firewall 56, one time passwords, encryption programs, digital certificates and user application security, for example. Various combinations of these security features may be used. In a preferred embodiment, these security approaches would be layered to provide a highly secure environment in which subscribers can share ideas and information. Encrypting may be accomplished by the use of virtual private networking technology or other technologies that evolve. In addition, security can be administered at the network, application, application module and user file levels to continually update needed profile information. The server farm 20 includes at least one application server 58 and a plurality of storage units 60 coupled together and to the firewall 56 by a hub 61 and local area network 62, for example. The number of storage units 60 will of course depend upon the number of applications provided and amount of user data stored on the server farm 20.

Figure 4:
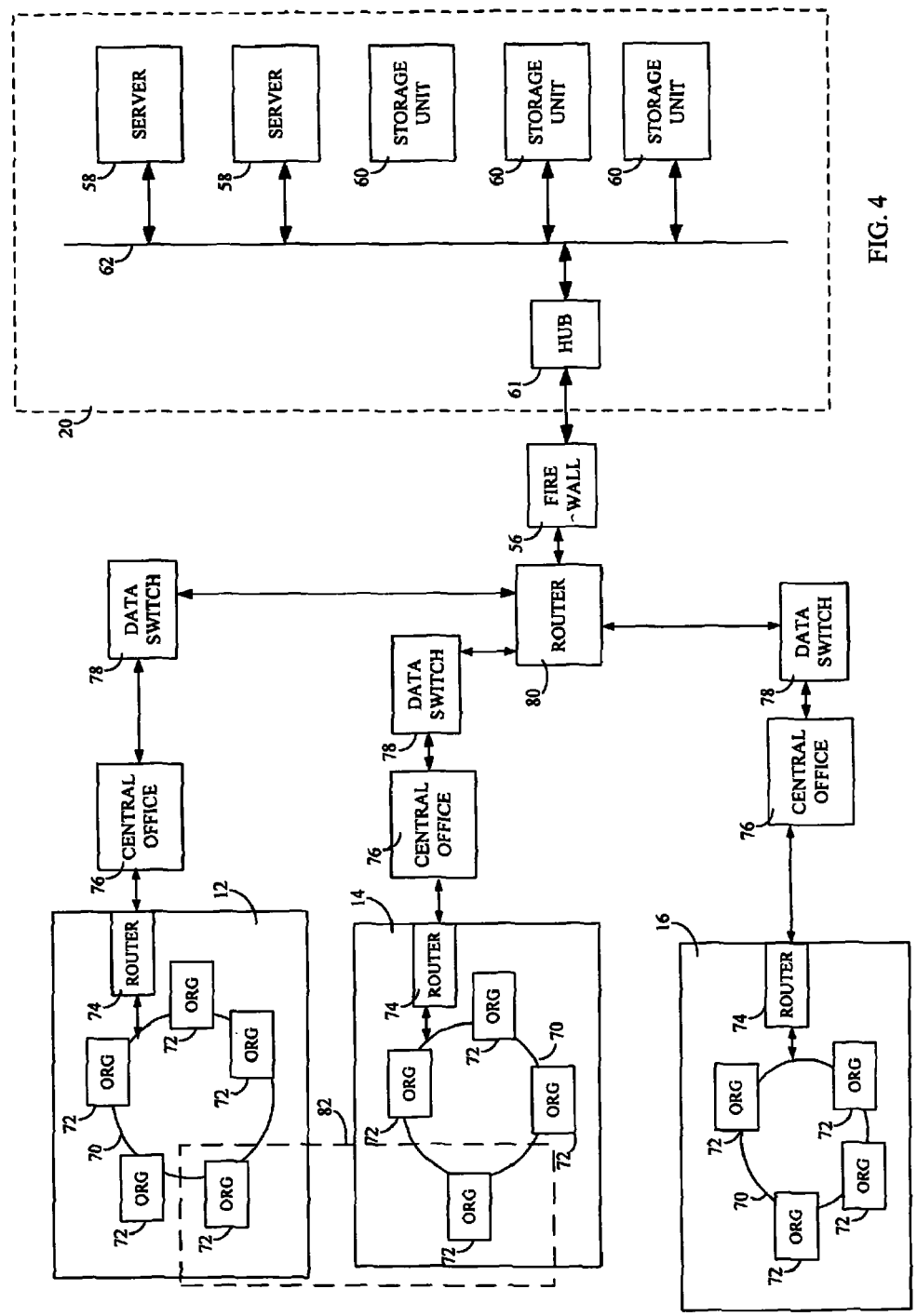
FIG. 4 is a still more detailed schematic block diagram of the extranet architecture shown in FIG. 1 according to a preferred embodiment of the present invention.

FIG. 4 is an even more detailed schematic block diagram of the extranet architecture shown in FIG. 1 according to a preferred embodiment of the present invention. Shown in FIG. 4 are subscribers 12, 14 and 16. Each subscriber may have its own intranet architecture 70 coupling its various organizations 72 which can be located at various geographic sites to one another. Alternatively, a subscriber may be one individual located at a standalone work station. Each subscriber accesses the extranet architecture through a router 74. As previously mentioned, the subscribers have various options for accessing the extranet architecture according to the present invention including analog or ISDN dial-up access or dedicated access using ATM, SMDS or frame relay protocols. FIG. 4 does not illustrate in detail the architecture for accessing the extranet architecture according to the present invention since those are well known to those of ordinary skill the art. Typically a PSTN central office 76 and a data network provider switch site 78 as well as an additional router 80 couple each subscriber to the firewall 56. In a preferred embodiment an additional router 80 is coupled to the firewall 56 by an Ethernet link. In a preferred embodiment a redundant additional router (not shown) would be provided as a back-up to additional router 80. The server farm 20 includes the hub 61, local area network 62, application servers 58 and storage units 60.

The operation of the extranet will now be described in detail. Various non-related subscribers are coupled to server farm 20 by access routers. The non-related subscribers are able to access applications and data stored by the application servers 58 and storage units 60 although access of some applications and/or data may be restricted based upon security concerns.

The present invention allows non-related entities to collaborate with one another in a simple, flexible manner without requiring any particular subscriber to maintain the integrity or currentness of the extranet. For example, company A may be working with non-related company B on the production of a part and require a logical project extranet 82 to be created between them. By using the extranet according to the present invention, companies A and B may securely exchange e-mail, participants in discussion for a collaboratively work on documentation, spread sheets, workflow schedules, etc. Importantly, the communications and data exchanged between companies A and B are secured from access by other subscribers on the extranet. Thus subscribers can flexibly add or delete subscribers on the extranet according to their needs. In addition, each subscriber has access to a large number of applications without having to maintain such applications. Thus, a communication link is established between the subscribers listed in a subscriber database by establishing appropriate routing tables within an established security policy.

Returning to FIG. 2 the various applications illustrated in the menu screen are commercially available products which may be used in the present invention. It will be appreciated that applications will be upgraded and new applications added and older ones deleted as the technology develops. For example, Livelink Intranet available from Open Text Corp of Toronto, Ontario Canada may be used as a collaboration software application. The Express and Trusted Link products from Harbinger Corp. of Atlanta, Ga. may be used for an electronic data interchange application software.

Figure 5:
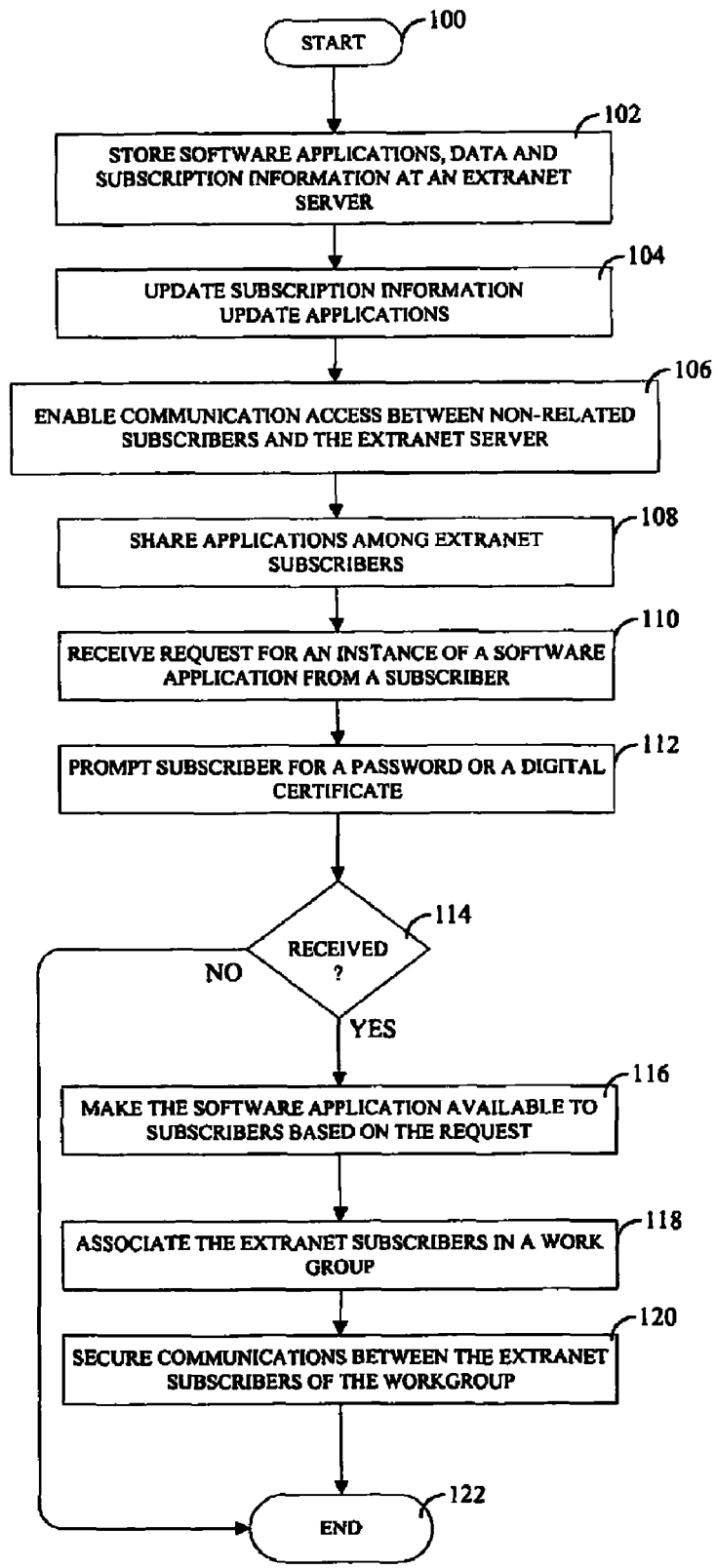
FIG. 5 illustrates an extranet method for providing extranet subscribers with access to software applications.

FIG. 5 illustrates an extranet method for providing extranet subscribers with access to software applications. The method begins at block 100. At block 102, an extranet server stores software applications, data and subscription information for extranet subscribers. At block 104, updates are performed on the stored information, including updating the subscription information and updating the stored applications. At block 106, communication access is enabled between non-related subscribers and the extranet server. At block 108, applications are shared among the extranet subscribers. At block 110, a request is received from a subscriber for an instance of a software application. At block 112, to ensure security, the subscriber is prompted for a password or a digital certificate. At block 114, if the correct response to the security prompt is not received, the method ends. Otherwise, at block 116, the software application is made available to subscribers based on the request. At block 118, the extranet subscribers are associated in a work group, such as logical project extranet 82 illustrated in FIG. 4. At block 120, communications are secured between the extranet subscribers of the workgroup so that that the communications and data exchanged are not available to other subscribers. The workgroup proceeds in operation and the method ends at block 122.

The foregoing description of the preferred embodiments of the present invention have been presented for purposes of illustration and description. It is not intended to be exhaustive or to limit the invention to the precise form disclosed. Many modifications and variations will be apparent to practitioners skilled in the art.

Furthermore, the preferred embodiments of the present invention would be customer driven in the applications hosted. Therefore, customers could suggest applications to include on the servers. For example, different subscribers using common computer aided design (CAD) software could request the inclusion on the servers of a file library developed by their CAD software vendor.

Similarly, any process steps described might be interchangeable with other steps in order to achieve the same result. The embodiments were chosen and described in order to best explain the principles of the invention and its practical application, thereby enabling others skilled in the art to understand the invention for various embodiments and with various modifications as are suited to the particular use contemplated.

The invention claimed is:

1. A collaborative enterprise extranet system comprising:
a data network to communicate data in accordance with an internet protocol, the data network accessible by a plurality of subscribers from a plurality of partner companies; and
a server system to communicate data with the data network to establish a virtual community among the plurality of partner companies and for facilitating secure collaboration within the virtual community, the server system having a plurality of collaboration tools that include:
a partner directory tool that lists subscribers in the virtual community and manages contact information;
a document sharing tool that provides collaborative access to documents between subscribers in the virtual community; and
a project management tool that facilitates management of projects and messages and establishes at least one workgroup within the virtual community;
wherein access by a subscriber of the plurality of subscribers to at least one of the plurality of collaboration tools is limited based on whether the subscriber is associated with the at least one workgroup.

2. The collaborative enterprise extranet system of claim 1 wherein the collaboration tools further include:
a transaction tool that facilitates transactions between at least two of the partner companies.

3. The collaborative enterprise extranet system of claim 1 wherein the collaboration tools further include:
a database tool that provides access to at least one database.

4. The collaborative enterprise extranet system of claim 3 wherein the at least one database includes a legacy database.

5. The collaborative enterprise extranet system of claim 1 further comprising:
security apparatus to control the access by a subscriber.

6. The collaborative enterprise extranet system of claim 5 wherein the security apparatus comprises a security policy including one or more routing tables to define a secure communication link between two or more subscribers of the workgroup.

7. The collaborative enterprise extranet system of claim 5 wherein the security apparatus comprises subscriber security profiles defining user association with the at least one workgroup.

8. A method for a collaborative enterprise extranet system, the method comprising:
providing access to a server system for a plurality of subscribers from a plurality of partner companies over a data network which communicates data in accordance with an internet protocol to establish a virtual community among the plurality of partner companies and to facilitate secure collaboration within the virtual community;
storing at the server system a plurality of collaboration tools, including
a partner directory tool that lists subscribers in the virtual community and manages contact information,
a document sharing tool that provides collaborative access to documents between subscribers in the virtual community, and
a project management tool that facilitates management of projects and messages and establishes at least one workgroup within the virtual community; and
limiting access by a subscriber of the plurality of subscribers to at least one of the plurality of collaboration tools based on whether the subscriber is associated with the at least one workgroup.

9. The method of claim 8 wherein storing a plurality of collaboration tools further comprises:
storing a transaction tool that facilitates transactions between at least two of the partner companies.

10. The method of claim 8 wherein storing a plurality of collaboration tools further comprises:
storing a database tool that provides access to at least one database accessible by subscribers associated with the at least one workgroup.

11. The method of claim 8 further comprising:
accessing subscriber subscription information of a subscriber database listing extranet subscribers to subscribe to the collaborative enterprise extranet system;
associating a plurality of subscribers as a workgroup of subscribers; and
making selected collaboration tools stored at the server system available to the subscribers of the workgroup.

12. The method of claim 11 further comprising:
updating the subscriber database to add new subscribers to the collaborative enterprise extranet system.

\* \* \* \* \*